United States Patent [19]

Matthews

[11] 4,261,334
[45] Apr. 14, 1981

[54] SOLAR COLLECTOR

[76] Inventor: Robert D. Matthews, 4562 Colonial Dr., Martinez, Ga. 30907

[21] Appl. No.: 928,148

[22] Filed: Jul. 26, 1978

[51] Int. Cl.$^3$ .............................................. F24J 3/02
[52] U.S. Cl. .................................. 126/438; 126/447; 126/450; 126/437
[58] Field of Search ............... 126/270, 271, 438, 437, 126/439, 440, 445, 446, 447, 450; 237/1 A; 285/DIG. 2; 138/89, 89.1

[56] References Cited

U.S. PATENT DOCUMENTS

| | | | |
|---|---|---|---|
| 1,801,710 | 4/1931 | Abbot | 126/441 |
| 3,227,153 | 1/1966 | Godel et al. | 126/271 |
| 3,358,869 | 12/1967 | Palmer et al. | 138/89 |
| 3,981,295 | 9/1976 | Minnick | 126/271 |
| 4,011,855 | 3/1977 | Eshelman | 126/441 |
| 4,023,555 | 5/1977 | Bailey | 126/424 |
| 4,091,793 | 5/1978 | Hermann | 126/270 |
| 4,103,673 | 8/1978 | Woodworth | 126/271 |
| 4,117,828 | 10/1978 | Brownfield | 126/270 |

FOREIGN PATENT DOCUMENTS

| | | | |
|---|---|---|---|
| 2530152 | 2/1977 | Fed. Rep. of Germany | 126/271 |
| 2612171 | 9/1977 | Fed. Rep. of Germany | 126/271 |
| 588667 | 6/1977 | Switzerland | 126/271 |

Primary Examiner—James C. Yeung
Attorney, Agent, or Firm—Newton, Hopkins & Ormsby

[57] ABSTRACT

A shallow open top sheet metal housing contains thermal insulating material on its side and bottom walls and is covered by a translucent top panel beneath which a multiplicity of translucent tubes in side-by-side contacting relationship provide dead air insulation. Serpentine copper tubing topped by a blackened flat copper sheet is arranged in a plane below and parallel to the plane in which the translucent tubes are positioned. The serpentine copper tubing is adapted for connection with a heated fluid circulating system externally of the collector. In a modification, a Fresnel lens concentrates solar rays on the copper tubing.

7 Claims, 14 Drawing Figures

SOLAR COLLECTOR

BACKGROUND OF THE INVENTION

The objective of the present invention is to provide a solar collector structure of increased efficiency and simplicity of construction, promoting economy of manufacturing. In accordance with one important aspect of the invention, a serpentine heat transfer fluid circulating coil is enclosed at its bottom and sides by blankets of thermal insulating material while the top of the coil receives solar rays through a bank of translucent side-by-side contacting tubes of any preferred cross sectional shape which form above the transfer coil a dead air insulation means including a multiplicity of separated cells. The translucent tubes may comprise discarded fluorescent light tubes. Above these tubes, the collector is closed by an edge sealed panel of glass or other translucent material.

A variety of solar collectors are known in the prior art and to comply with the duty to disclose required by 37 C.F.R. 1.56, the below-listed prior United States patents of some relevance are made of record herein, U.S. Pat. Nos.:
3,464,402
3,990,914
4,016,860
4,018,215
4,033,324
4,033,327.

Prior art solar collectors have tended to be unduly expensive and frequently complex in construction and therefore not entirely practical from an economic standpoint. Therefore, a further object of this invention is to improve on the known prior art by simplifying the structure of the collector and reducing its manufacturing cost while simultaneously improving its overall operational efficiency.

Other specific objects and advantages of the invention will appear to those skilled in the art during the course of the following detailed description.

DETAILED DESCRIPTION

Figure 1:
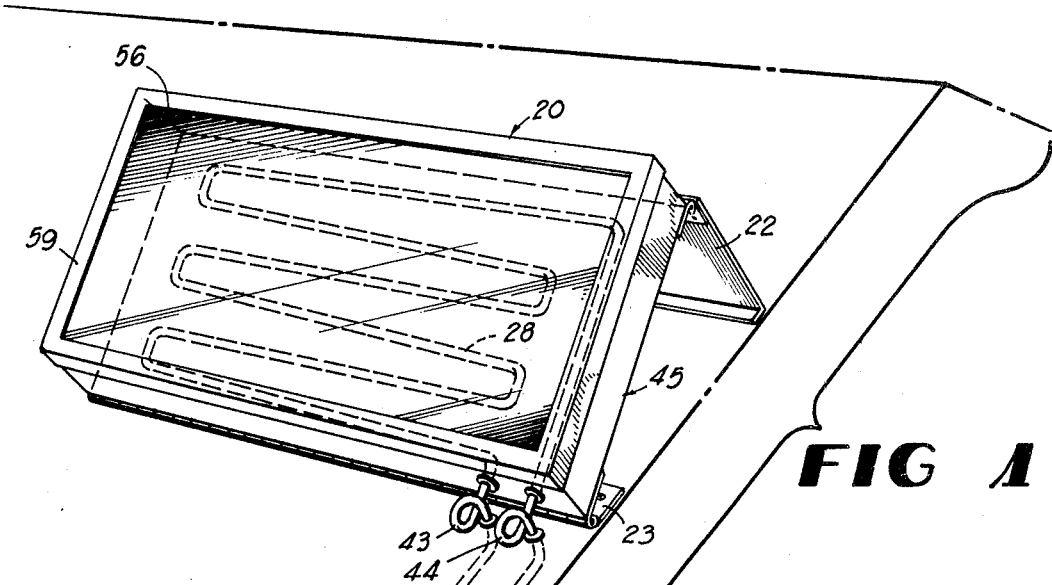
FIG. 1 is a partly schematic perspective view of a roof mounted solar collector embodying the invention in association with a circulating water heating system.

Referring to the drawings in detail wherein like numerals designate like parts, and referring first to FIG. 1, a solar collector 20, to be fully described, is shown mounted on a building roof 21 in a winter position through the medium of an upper rigid support leg 22 and a lower hinged adjustable leg 23 which is in the collapsed or down position but can be extended and locked in an elevated position at proper times to change the angle of inclination of the collector 20.

The collector 20 is shown associated with a heated fluid storage and circulating system 24, such as a home hot water heating system. This system may comprise a primary hot water holding tank 25 and an adjacent reserve tank 26, both tanks connected through a control module 27 with a copper serpentine heat transfer coil 28 in the collector 20, as will be further described. A circulating pump 29 for the system draws water from the tank 25 and delivers it through a supply line 30 to the collector coil 28 where the water is heated by solar energy and is then returned through a return line 31 to the control module 27.

Figure 2:
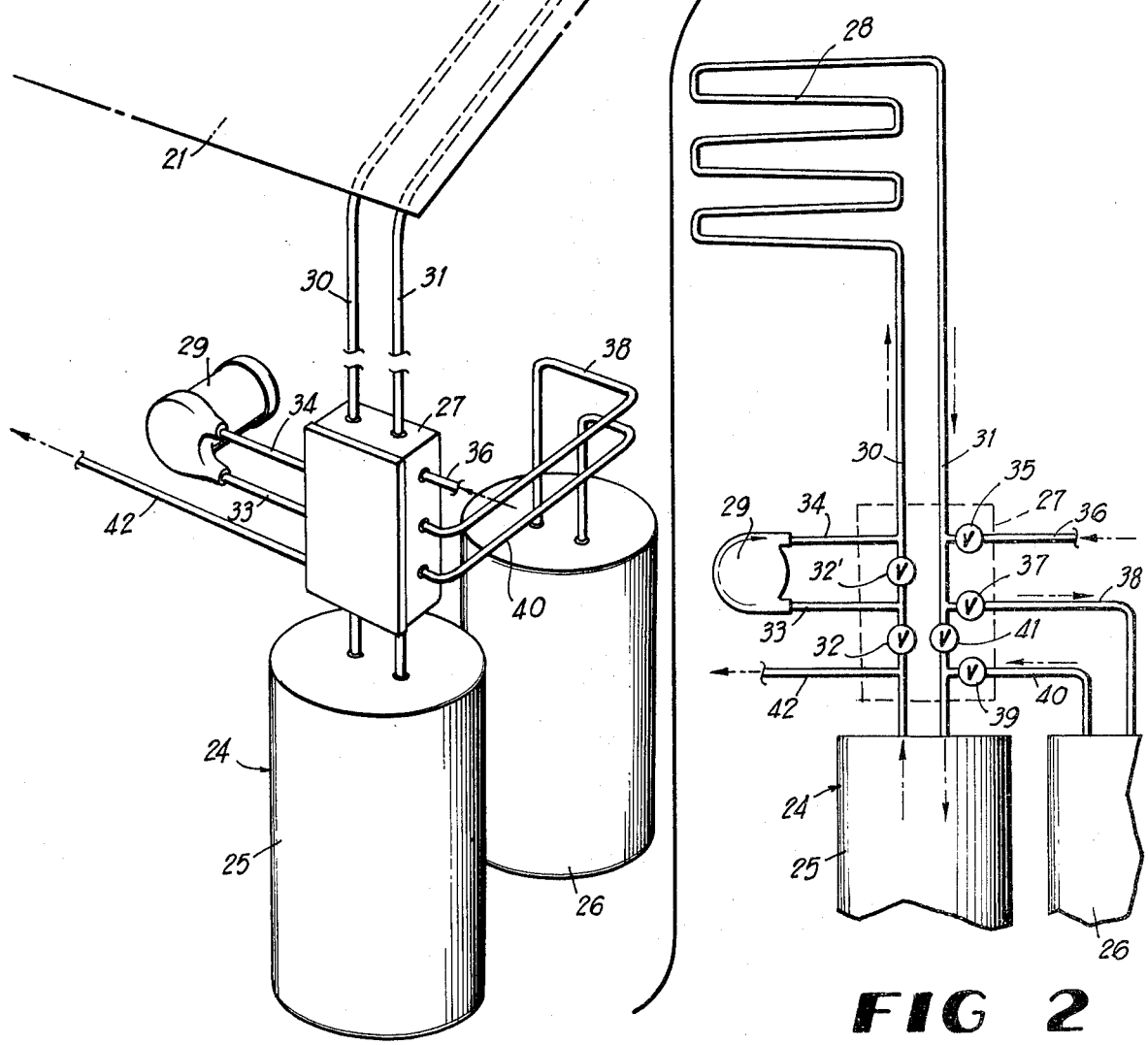
FIG. 2 is a partly schematic elevational view of the heated fluid storage and circulating system embodied in the invention.
Figure 3:
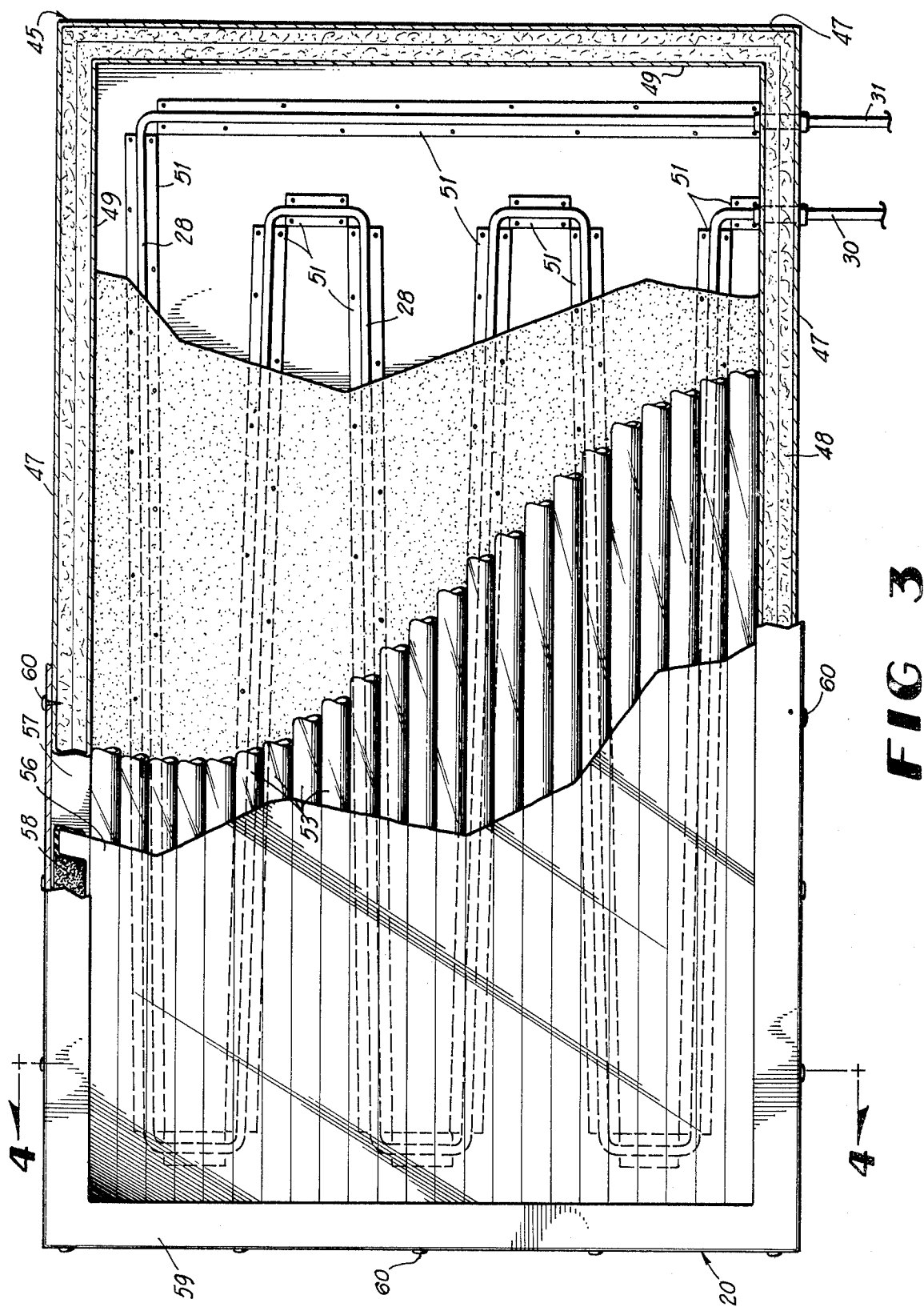
FIG. 3 is an enlarged plan view of the solar collector partly in section and partly broken away.
Figure 4:
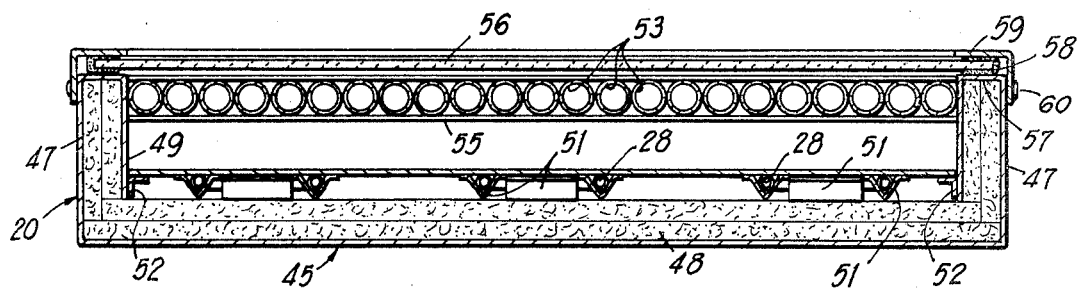
FIG. 4 is a transverse vertical section through the collector taken on line 4—4 of FIG. 3.

As shown in FIG. 2, the module 27 contains a normally open value 32 in the line 30 between the tank 25 and pump 29, and the normally closed valve 32' in the same line between the pump intake and outlet pipes 33 and 34. Another normally open valve 35 in the return line 31 is connected in a cold water inlet pipe 36 which is a part of the city supply. A normally open valve 37 is similarly connected in the inlet line 38 of reserve tank 26 and a normally open valve 39 is connected in the outlet line 40 leading from the reserve tank to the line 31. A normally closed valve 41 is provided in the line 31 between the lines 38 and 40 and their valves. A house supply line 42 for hot water leads from the line 30, as shown. The valve 32 is for system isolation and the valve 32' is an anti-freeze valve. The valve 37 is for reserve tank isolation and the valve 41 is to permit the use of the primary tank 25 and solar collector coil 28 without the use of the reserve tank 26. The valve 39 is also for reserve tank isolation and the valve 35 is a cut-off valve for city water, often an existing valve. The illustrated flow control system in the module 27 is conventional and need not be further described for purposes of this invention. As illustrated in FIG. 1, the two lines 30 and 31 are suitably coupled through one side wall of the collector housing with terminal ends 43 and 44 of the collector coil 28. If preferred, other forms of heated fluid storage and circulating systems may be used with the solar collector 20, now to be described in detail and forming the main subject matter of the invention.

The collector 20, FIGS. 3 to 9 inclusive, comprises a relatively shallow rectangular open top housing 45 preferably formed of galvanized sheet metal and having a flat bottom wall 46 and upstanding side walls 47 rising therefrom at right angles thereto. A thick blanket of thermal insulating material 48 completely covers the interior surfaces of the bottom and side walls 46 and 47, and an interior continous side panel or flange 49 integrally connected with the side walls 47 and extending around all four sides of the rectangular housing 45 confines the side wall insulation blanket and forms a convenient hold down means for the bottom wall insulation.

The previously-noted serpentine copper collector coil or heat transfer coil 28 is positioned slightly above the bottom wall insulation in a horizontal plane and the several spaced serpentine loops of the coil 28 span substantially the entire rectangular area of the collector 20, as shown. The coil 28 is braised or soldered to the bottom face of a thin flat copper sheet 50 whose upper surface has a dull black finish. The copper sheet 50 spans substantially the entire interior of the collector housing 45 as defined by its interior flange 49. V-cross section support brackets 51 are attached by riveting or the like to the bottom of the copper sheet 50 and these brackets substantially contact the bottom wall insulation blanket 48. Angle bars 52 at appropriate locations on the side flanges 49 of the housing underlie edge portions of the copper sheet 50 and thus lend support to this sheet and to the coil 28 carried by it. The coil 28, sheet 50 and the underlying brackets 51 constitute a unit sub-assembly in the collector.

Figure 5:
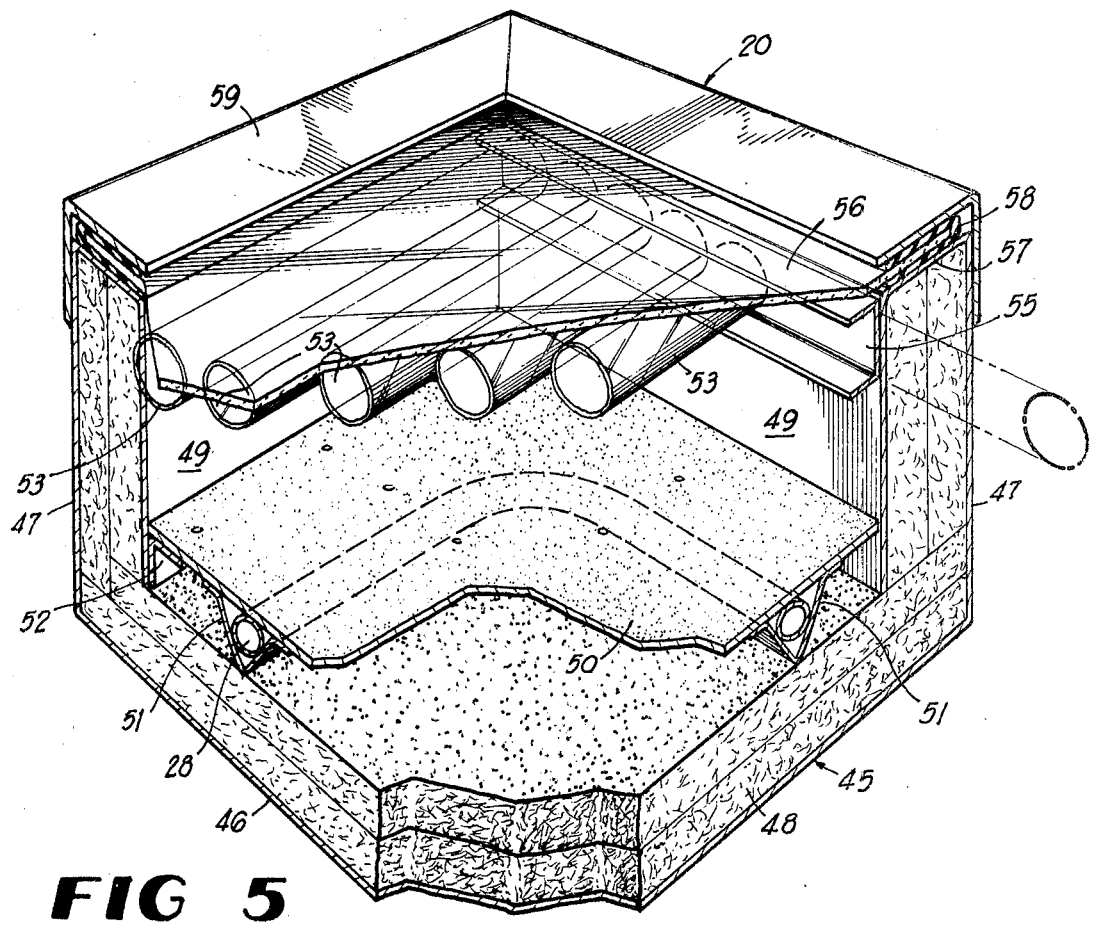
FIG. 5 is an enlarged fragmentary perspective view of one corner portion of the collector partly in section.
Figure 6:
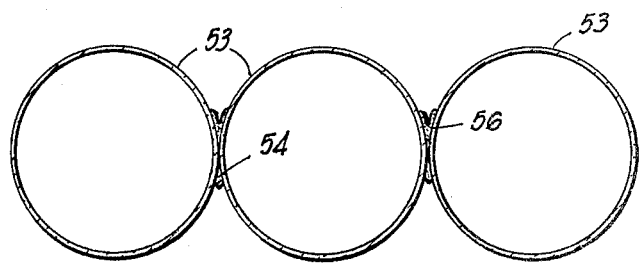
FIG. 6 is a fragmentary cross section taken through a bank of solar energy transmitting tubes which also provide thermal insulation for the top of the solar collector.

An important feature of the collector 20 is the provision near the top thereof in a horizontal plane spaced from and parallel to the plane of sheet 50 of a bank of side-by-side contacting equal length preferably glass tubes 53. These tubes may be discarded cleaned-out fluorescent light tubes and, as such, are extremely inexpensive. Preferably, but not necessarily, the adjacent contacting tubes 53 are sealed by a suitable sealant 54, as shown in FIG. 6, to prevent the circulation of air between them. In some cases, the tubes 53 may be other than circular in cross section. The translucent tubes 53 form a multiplicity of non-communicating dead air insulating cells at the top of the collector housing at all times while transmitting solar rays freely onto the collector plate 50 and associated coil 28. The opposite ends of the multiple tubes 53 are supported in channel members 55 mounted on the interior side flanges 49 of the collector housing, as best shown in FIG. 5.

Immediately above the bank of insulating tubes 53, a preferably glass rectangular flat cover panel 56 rests upon an upper ledge 57 of the housing 45 and has its marginal edge portion sealed with this ledge by a continuous U-cross section gasket 58. A continuous rectangular hold-down frame 59 for the glass cover panel 56 is provided on the solar collector and this frame is of right angular cross section, with the upper web thereof resting on the gasket 58 and its side depending web being secured by suitable fasteners 60 to the side wall 47 of the collector housing. The arrangement is secure and very sturdy, as well as economical.

It should also be mentioned that the glass tubes 53 in addition to forming a dead air insulating barrier tend to concentrate or focus solar rays onto the sheet 50 and coil 28 and this is an added advantage of the arrangement.

Figures 7, 8, 9:
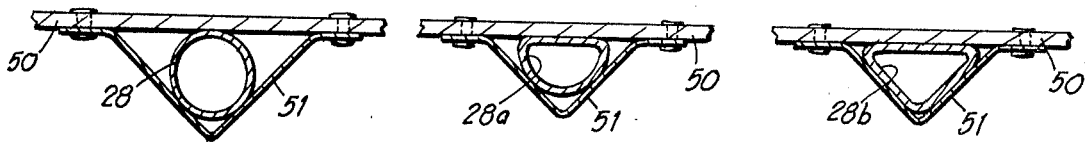
FIGS. 7, 8 and 9 are cross sectional views taken through a copper heat exchange or transfer coil for circulating fluid in the collector showing variants in cross sectional shape.

As shown in FIGS. 8 and 9, respectively, the copper serpentine tubular coil may be a half round coil 28a in cross section or may be a triangular coil 28b for a greater heat transferring efficiency in the invention, if preferred. In actual production, the configuration of FIG. 8 is recommended since it is easy to produce and requires few tools and jibs to flatten one side 28a and concaved brackets 51 are easily produced.

Figure 10:
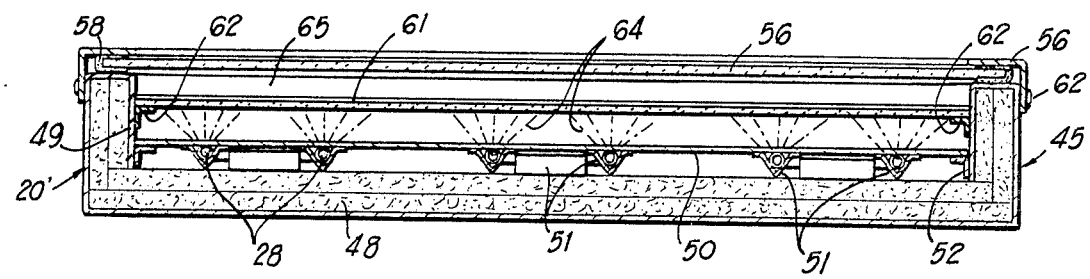
FIG. 10 is a cross sectional view, similar to FIG. 4, showing a modification of the invention wherein a Fresnel lens is employed to focus solar rays on the copper transfer coil.
Figure 11:
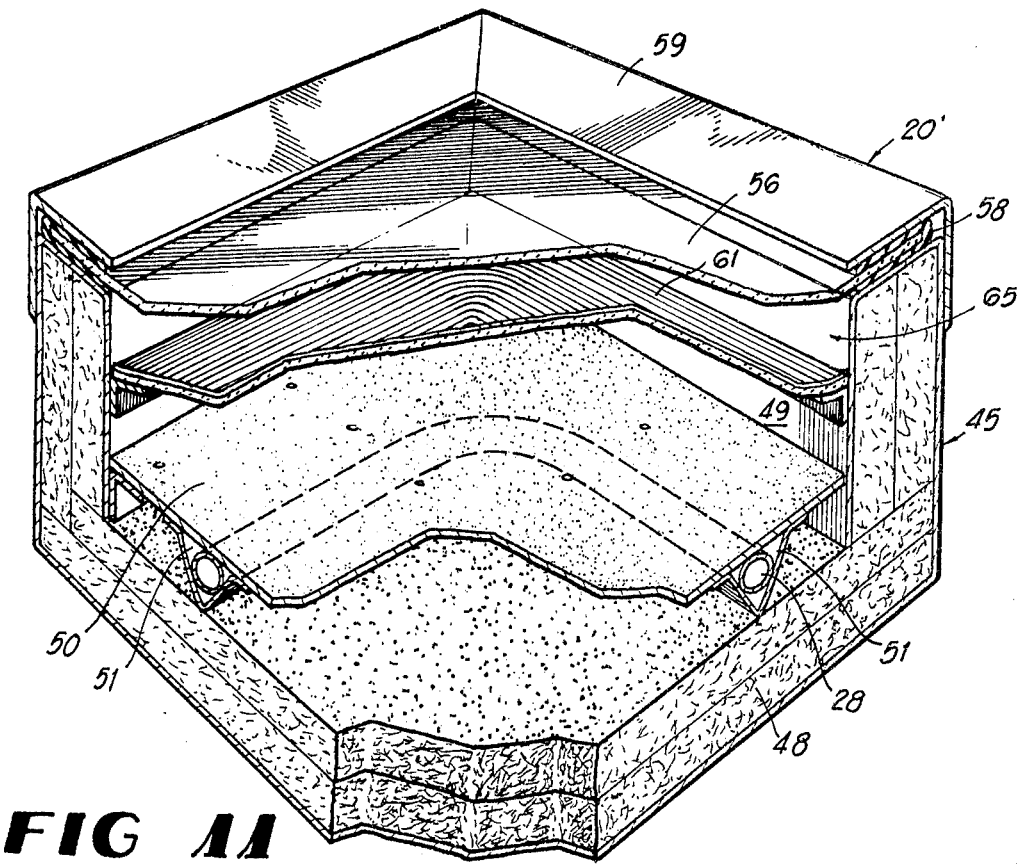
FIG. 11 is a perspective view, similar to FIG. 5, showing a modification at one corner portion of the collector.
Figure 12:
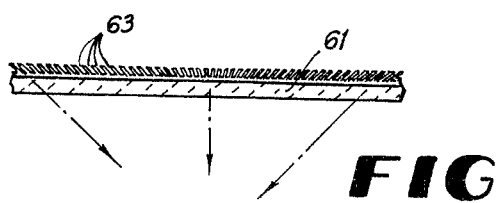
FIG. 12 is a fragmentary cross section taken through the Fresnel lens.

FIGS. 10 to 12 inclusive show a modified solar collector 20' having the identical galvanized metal housing 45 previously described, the same side and bottom wall insulation 48, glass cover panel 56, hold down frame 59, and the same serpentine copper heat absorbing and transfer coil 28 and copper cover sheet 50 previously described.

In lieu of the glass tubes 53 in the prior embodiment of the invention, a Fresnel lens 61 of rectangular form is disposed in the housing 45 between the copper sheet 50 and the glass cover panel 56. The lens 61 spans the entire interior chamber of the solar collector and is supported by angle bar sections 62 attached to the interior flanges or walls 49. The Fresnel lens formed of plastic has its small ridges 63 designed to focus and concentrate the solar energy rays entering the top of the collector downwardly onto the various loops or runs of the serpentine coil 28 as depicted graphically in FIG. 10 by the ray lines 64. In a structural sense, the elimination of the glass tubes 53 and the addition of the Fresnel lens 61 constitutes the only difference in the two forms of the invention. The lens 61 and cover panel 56 create a single continuous dead air insulating space 65 between them in the solar collector.

The solar collector in either form is simplified and economical to manufacture, very efficient in operation for heating water or similar application, and has superior insulation on all sides of its chamber. As a result, there is less condensation of water on the collector internally and externally. The construction is quite rugged and therefore very durable. The use of the glass tubes 53 to create a dead air insulating means beneath the cover panel 56 is much less costly than using a second glass panel in this area, due to the fact that the tubes 53 are discarded light tubes. The many advantages of the invention over the prior art should now be apparent without the necessity for further description.

During usage of the solar collector in the water heating and storage system of FIGS. 1 and 2, with the pump 29 in operation and the valves and the module 27 in their normal positions, as described, water is circulated continuously in the system as shown by the flow arrows in FIG. 2. Thermal energy is continually absorbed by the serpentine coil 28 in the collector aided by the focusing and concentrating effects of the tubes 53 or Fresnel lens 61.

Figure 13:
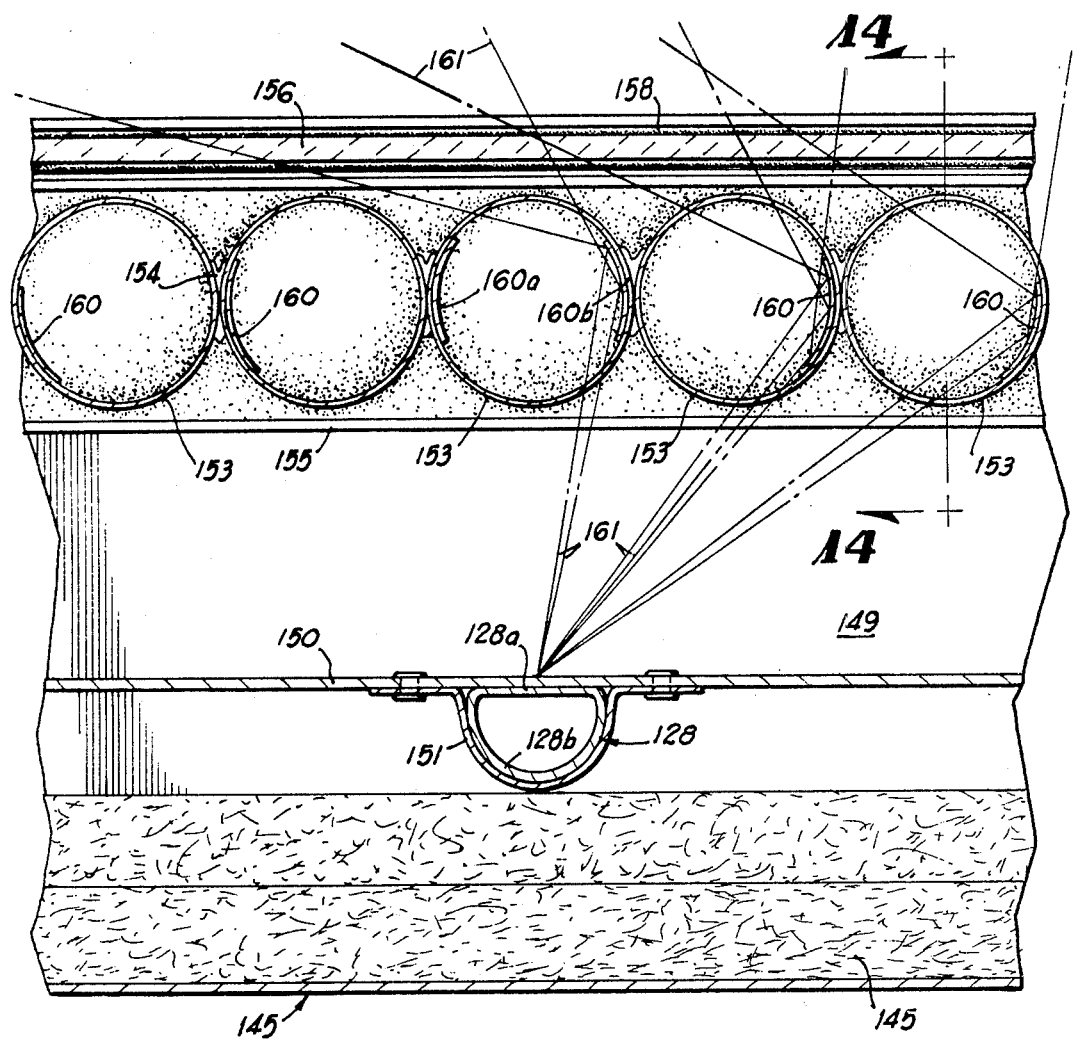
FIG. 13 is an enlarged vertical sectional view of a modified form of collector constructed in accordance with the present invention.
Figure 14:
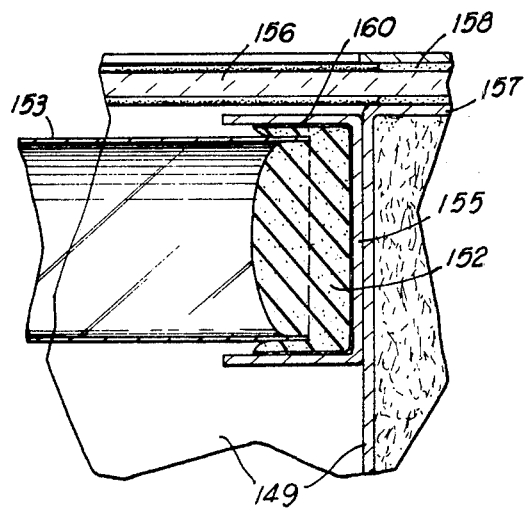
FIG. 14 is a vertical sectional view taken substantially along line 14—14 in FIG. 13.

In the modified form of the invention shown in FIG. 13 and FIG. 14, the open top rectangular housing 145 has insulation material 148, an interior continuous side panel or flange 149, a copper heat absorbing and conducting sheet 150, a glass cover panel 156 provided along its edges with a U-shaped gasket 158 and supported by the upper ledge 157, all constructed identically to the construction of the previously described housing 45, material 48, panel 49, sheet 50, panel 56, ledge 57 and gasket 58 of the preceeding embodiment. The water conducting heat transfer coil or tube 128 has a flatten or straight upper periphery 128a which merges with the rounded or cylindrical lower periphery 128b throughout the length of the coil or tube 128. Thus, the flatten upper periphery 128a fits flat or flush against the lower surface of sheet 150 and is secured thereto by spaced C-shaped brackets, such as bracket 151.

The equal length, parallel, juxtaposed, glass tubes 153, have abutting edges of which are secured together by sealant 154. These tubes 153 are disposed below panel 156 and above the sheet 150. The opposite ends of tubes 153 are received by a pair of opposed channel members, such as member 153, being embedded in resilient foamed rubber rectangular blocks 152 adhered by adhesive 160 on three sides to the inside surfaces of the channel member 155. Thus, the open ends of tubes 153 are quite effectively sealed, as the foam rubber blocks 152 are deformed to bulge into the end portions of each tube 153 and around the outer end portion, as seen in FIG. 14. Tube 128 and tubes 153 are parallel to each other.

According to the present embodiment, the surface of each tube 153 is provided with a rectangular flexible reflective plastic sheet 160 adhered along a segment of the surface of tube 153, throughout its length. This sheet 160 covers from about 30° to about 120° of surface of the tube 153 and functions to reflect and direct the suns rays, indicated by numeral 161 in FIG. 13, toward the area of sheet 150 which supports the tube 128. Thus, the reflective sheets 160 on the tubes 153 one side of a tube 128 may be located on an outer side of its tube 153 and be concaved toward the tubes on the opposite side, as shown in FIG. 13. Also, some tubes 153 may have opposed reflective sheets, such as sheets 160a, 160b for the tube vertically above a tube 128.

The sheets 160, 160a, 160b are preferably formed from sheets known as "scotch tint". They can be on the inside or outside of tubes 153 provided the reflective portion is on the concaved sides.

The foam rubber blocks, such as block 152, permits each tube 153 to be rotated about its axis to suit a particular location, provided the sealant 154 has not been applied.

In place of the channel member 155, the block 152 can, if desired, be recessed in the interior wall of the housing 145.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A solar collector comprising a collector housing open at its top and including thermally insulated bottom and side walls, a thermal energy absorbing and transfer unit disposed in said housing near said bottom wall and top closure panel for said housing having fluid sealing engagement therewith around the upper margin of the housing and being formed of solar energy transmitting material, and means positioned within the housing above said absorbing and transfer unit and below said closure panel and forming a dead air thermal insulating zone immediately below said closure panel and also serving to focus energy rays onto said absorbing and transfer unit, said means having juxtaposed hollow tubular energy transfer lens elements defining additional dead air spaces, said elements comprising a multiplicity of equally sized solar energy transmitting tubes disposed in side-by-side contacting relationship and spanning substantially the entire interior area of the housing and lying in a common plane substantially parallel to the planes of said absorbing and transfer unit and said closure panel, sealant disposed along the contacting surfaces of said tubes, and a reflective plastic along portions of the tubes for directing the rays of the sun toward selected portions of said absorbing and transfer unit, said unit including heat transfer tubes parallel to said first mentioned tubes and said plastic being along laterally opposed side surfaces of said tubes, the bottom and top portions of said tubes being free of said plastic.

2. A solar collector comprising a collector housing open at its top and having a bottom wall, a thermal energy absorbing and transfer unit disposed in said housing near said bottom wall and spanning substantially the entire interior area of the housing, a top closure panel for said housing having fluid sealing engagement therewith around the upper margin of the housing and being formed of solar energy transmitting material, a plurality of parallel juxtaposed discarted fluorescent light tubes having abutting sides positioned within the housing above said absorbing and transfer unit and below said closure panel and forming with said closure panel a dead air thermal insulating zone immediately below said closure panel, sealant joining the abutting sides of said tubes, reflective material along the sides of certain of said tubes for reflecting the rays of the sun which pass angularly through said closure panel downwardly onto said absorbing and transfer unit, said unit including a sheet of metal and metal tubing in contact with and secured to the lower side of said sheet metal and through which a fluid to be heated is passed, and insulating material below said sheet metal and within said housing.

3. A solar collector comprising, a collector housing open at its top and including thermally insulated bottom and side walls, a thermal energy absorbing and transfer unit disposed in said housing near said bottom wall and spanning substantially the entire interior area of the housing, a top closure panel for said housing having fluid sealing engagement therewith around the upper margin of the housing and being formed of solar energy transmitting material, and a plurality of discarded fluorescent light glass tubes positioned side-by-side spanning substantially the entire area in the housing above said absorbing and transfer unit and below said closure panel for forming a dead air thermal insulating zone immediately below said closure panel and a second dead air thermal insulating zone immediately above said unit and also serving as a third dead air or gas space therebetween, said tubes having reflective surfaces along the lateral sides of said tubes for focusing solar energy rays passing through said top panel onto said absorbing and transfer unit.

4. A solar collector as defined in claim 3, and supporting and closing channel members on the interiors of opposite side walls of said housing receiving and supporting opposite end portions of said glass tubes in said common plane.

5. The solar collector defined in claim 3 including resilient blocks carried by said housing and wherein the ends of said tubes are received in said resilient blocks.

6. A solar collector comprising a housing open at its top and including thermally insulated bottom wall and side walls, a thermal energy absorbing and transfer unit disposed in said housing near the bottom wall and spanning substantially the entire interior area of said housing, a plurality of discarded fluorescent light tubes positioned side-by-side within said housing and across substantially the entire interior area above said thermal energy absorbing and transfer unit, and reflective means affixed along arcuate bottom laterally opposed side surfaces of said tubes, said reflective means terminating in spaced relationship to the bottom and top portions of said tubes whereby the bottom and top portions of said tubes are unobstructed by said reflective means and whereby solar rays entering the collector angularly from one lateral side or the other of said tubes will be reflected downwardly and onto said unit by said reflector means and solar rays enter the collector generally perpendicularly to said energy absorbing and transfer unit will pass through the unobstructed top and bottom portions of said tubes.

7. The solar collector defined in claim 6 wherein said reflective means are plastic coatings on the arcuate surfaces of said tubes in positions which do not appreciably block perpendicular solar rays from passing through said tubes.

* * * * *